(No Model.) 2 Sheets—Sheet 1.

H. G. ASHTON & R. GOULD.
SAFETY VALVE.

No. 306,208. Patented Oct. 7, 1884.

Witnesses.
Lauritz W. Möller
John R. Snow

Inventor
Henry G. Ashton
Randall Gould
by their attorney,
J. E. Maynadier (No Model.) 2 Sheets—Sheet 2.
H. G. ASHTON & R. GOULD.
SAFETY VALVE.

No. 306,208. Patented Oct. 7, 1884.

Witnesses.
Lauritz W. Möller
John R. Snow

Inventor
Henry G. Ashton
Randall Gould
by their attorney
J. E. Maynadier

UNITED STATES PATENT OFFICE.

HENRY G. ASHTON, OF SOMERVILLE, AND RANDALL GOULD, OF BOSTON, MASS., ASSIGNORS TO THE ASHTON VALVE COMPANY, OF MASS.

SAFETY-VALVE.

SPECIFICATION forming part of Letters Patent No. 306,208, dated October 7, 1884.

Application filed April 11, 1884. (No model.)

*To all whom it may concern:*

Be it known that we, HENRY G. ASHTON, of Somerville, in the county of Middlesex and State of Massachusetts, and RANDALL GOULD, of Boston, in the county of Suffolk and State of Massachusetts, have invented an Improved Safety-Valve, of which the following is a specification, reference being had to the accompanying drawings, making a part hereof.

Our invention is a safety-valve working on principles wholly new, so far as we are aware, as is fully explained below.

Our invention may be embodied in a great variety of forms, as will be obvious when it is fully understood, and in the accompanying drawings we have shown the invention embodied in the best form now known to us, as well as sundry modifications, in order to make more clear the operation of safety-valves constructed on our new principle.

Figure 1:
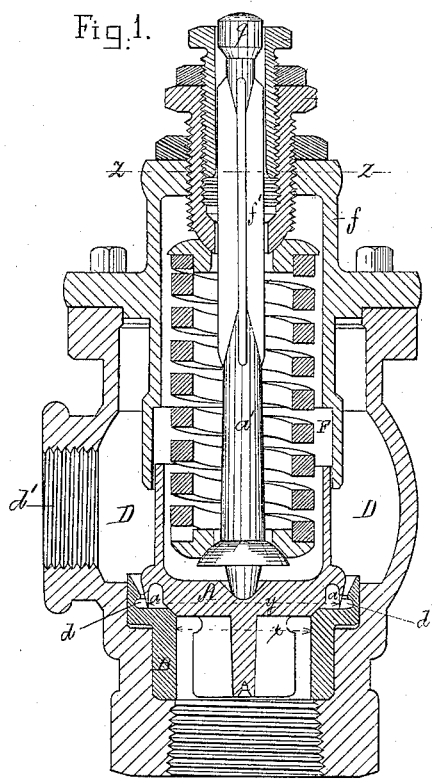
Figure 4:
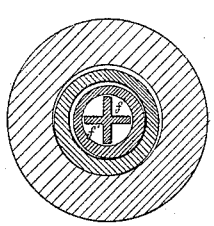
Figure 5:
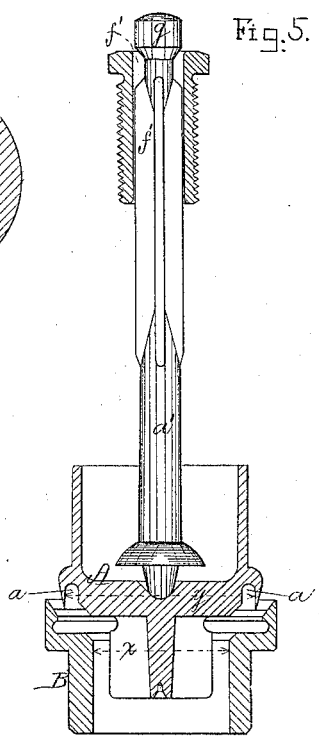
Figure 2:
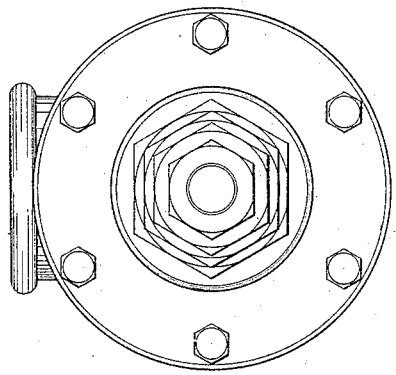
Figure 3:
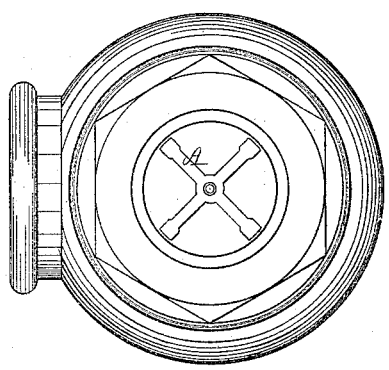
Figure 6:
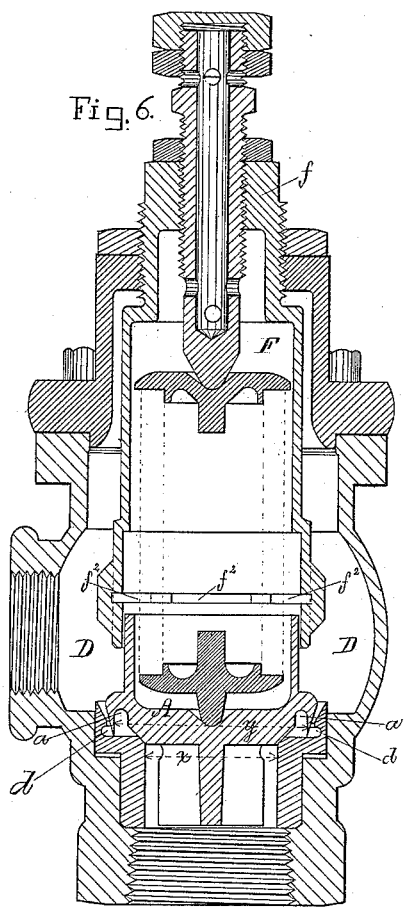
Figure 7:
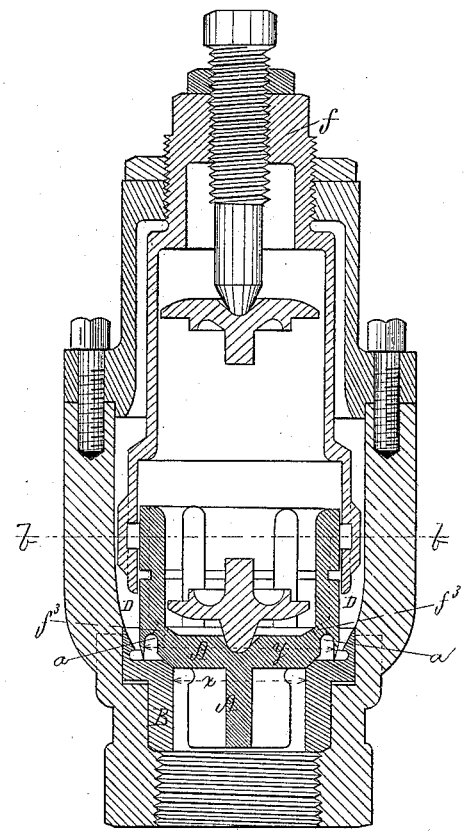
Figure 8:
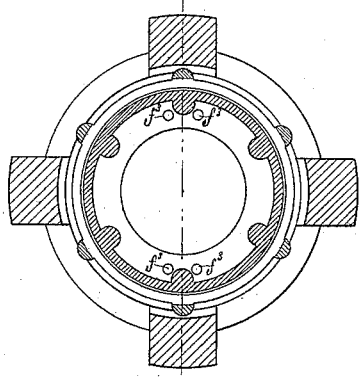
Figure 9:
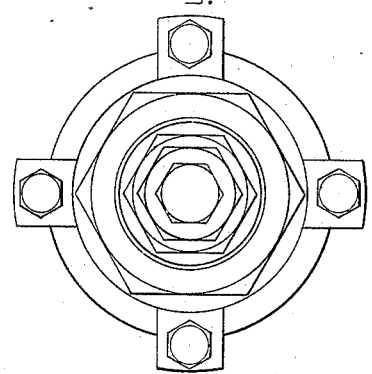

In the drawings, Figure 1 is a vertical central section. Fig. 2 is a top view of Fig. 1. Fig. 3 is a bottom view of Fig. 1. Fig. 4 is a section on line $z\,z$, Fig. 1. Fig. 5 is a diagram for illustration. Fig. 6 is a vertical central section. Fig. 7 is a vertical central section. Fig. 8 is a cross-section on line $b\,b$, Fig. 7. Fig. 9 is a top view of the valve, Fig. 7.

The valve A has an area above its seat considerably larger than its area at its seat, and is so formed in relation to its bushing B as to form a small chamber, $a$, into which the steam which escapes between the valve and its seat enters. This feature is well known in all valves of the kind called "pop-valves," the chamber $a$ being commonly called the "pop-chamber," and its purpose is to cause a considerable increase in the lifting force of the steam as soon as the valve leaves its seat, for when the valve is on its seat the lifting force of the steam is exerted upon the area whose diameter is shown by the dotted line marked $x$, while as soon as the valve leaves its seat the lifting force of the steam is exerted upon the area whose diameter is shown by the dotted line $y$, and consequently the total lifting force of the steam is considerably greater, although the pressure per square inch is less upon area $y$ than upon area $x$, and this is essential in order to get any considerable rise in a spring-loaded valve, because the power of the spring must necessarily be considerably greater when the valve is above its seat than when it is on its seat, for the spring has been shortened by the rise of the valve. The pressure of the steam in the pop-chamber $a$ will depend obviously upon its pressure in the boiler and upon the relative areas of the inlet and outlet of the pop-chamber, (assuming the outlet from the pop-chamber to be into open air;) consequently to make the valve work promptly (that is, rise to its full height as soon as the boiler-pressure reaches the point at which the valve should open) it is desirable to have the outlet from the pop-chamber $a$ as small as possible when the valve is on its seat, for the inlet into the pop-chamber (that is, the space between the valve and its seat) is necessarily very small when the valve first begins to rise, which is when the lifting power of the steam upon area $x$ begins to slightly exceed the force of the spring, and therefore the pressure of steam in the pop-chamber $a$ will be very small at first, in accordance with the well-known laws determining the steam-pressure in a chamber with an outlet of a given area and into which steam at a given pressure flows through an inlet of a given area; but when this outlet from the pop-chamber $a$ is made sufficiently small to give the promptest action, and the excess of area $y$ over area $x$ is sufficiently great to get the usual rise of a pop-valve, (about one-tenth of an inch,) the valve will not close until the steam-pressure in the boiler is reduced too much, and consequently, in the construction of pop-valves as heretofore made, the greatest care is requisite, not only as to the stiffness of spring, but also in proportioning the areas $x$ and $y$, and in determining the minimum area of the outlet from the pop-chamber—that is, the area of that outlet when the valve is on its seat—for while both the inlet into and the outlet from the pop-chamber $a$ increase in area as the valve rises, the outlet is never wholly closed in pop-valves as heretofore constructed.

In our new valve the pop-chamber $a$ is made on the well-known principle, except that it gives an excessive pop, no great care being requisite as heretofore in proportioning the areas of $x$ and $y$ and the minimum area of outlet from the pop-chamber, because it is intended that the valve shall be so constructed that it will rise as soon as the boiler-pressure reaches the point at which the valve is set to blow, and rise not only suddenly, but give a large area for the escape of steam from the boiler, these being the desirable features of a safety-valve, and easily attained by all skilled in this art, provided the pressure in the boiler when the valve closes be disregarded. For example, the valve shown in the drawings, if used without the new principle of closing, would remain open until the steam-pressure in the boiler was more than twenty per cent. less than what it was when the valve opened—that is to say, if the valve opened at a boiler-pressure of fifty pounds to the square inch, it would not close until the pressure was reduced below forty pounds, which is, of course, wholly inadmissible in the practical use of steam.

It will be seen that the escaping steam is confined somewhat in the discharge-chamber D, and that consequently a small part of the steam will enter the chamber F between the upper part of valve A and the inner casing, $f$, which is part of the wall separating chamber D from chamber F, and the steam which enters chamber F will tend to create steam-pressure in that chamber. Now, if the steam-pressure in chamber F be so regulated that it will increase as soon as the valve begins to approach its seat, it is clear that it may be used to aid the spring in forcing the valve down upon its seat, and thereby a pop-valve can be produced with an excessive pop which will nevertheless close as soon as the boiler-pressure has been reduced slightly below the pressure at which the valve opened.

This is our new principle—namely, causing the valve to close when the boiler-pressure has been slightly reduced by the pressure of the waste steam in a chamber in which the valve rises.

It is obvious that two modes may be used for regulating the pressure of the waste steam in chamber F—one by diminishing the outflow from chamber F, the other by increasing the inflow into chamber F, these two modes being the same in principle and accomplishing the same result, being merely the converse one of the other.

The most convenient way for diminishing the outflow from chamber F consists in securing a suitable plunger, $g$, to the valve, (by means of spindle $a'$, as shown in Figs. 1 and 5,) which plunger rises with the valve, and thereby gives the maximum area to outlet $f'$ of chamber F when the valve is blowing, and as the inflow into chamber F (through the space between valve A and casing $f$) is small and constant, it follows that the outflow of waste steam from chamber F is at the maximum when the valve is highest; but as the lifting force of the steam under area $y$ when the valve is highest is just equal to the total closing force, (that is, the force exerted by the spring and by steam-pressure in chambers F and D upon the upper surface of valve A,) it will be clear that as soon as the boiler-pressure is reduced slightly the closing force becomes slightly greater than the lifting force; hence the valve A begins to approach its seat; but that lowers plunger $g$, and that diminishes the outflow of waste steam, and that retains the steam-pressure within chamber F, which enables the total closing force or load to close the valve before the boiler-pressure is materially reduced. The converse of this construction is shown in Fig. 6. Here the inflow of waste steam into chamber F is at the minimum when the valve is blowing off; but as the valve begins to move toward its seat the ports $f^2$ begin to open, and consequently more steam enters chamber F—that is, the inflow of waste steam into chamber F is increased, instead of the outflow being decreased, as before; but the same result follows—namely, the pressure of the waste steam in chamber F is sufficient to produce the same operation as before.

In many kinds of safety-valves the escaping steam is necessarily so confined as to produce an ample pressure in the discharge-chamber D, and in both classes of valves above described the waste steam flows from discharge-chamber D into the valve-chamber F; but when there is no discharge-chamber D, or when for any reason the waste steam used to aid in closing the valve by its pressure in chamber F is not taken from the discharge-chamber D, it must be taken from the pop-chamber $a$, and a convenient way for doing this is illustrated in Figs. 7, 8, and 9. In these figures the area of the inlet $f^3$ for the waste steam from the pop-chamber $a$ into the valve-chamber F is constant, and the area of outlet for the waste steam from chamber F is therefore made adjustable; but, obviously, converse means may be used, as before.

The construction and operation of the adjusting means will be clear from the drawings without further explanation.

Another feature of our invention relates to means for giving the valve a rise far more than that of any other valve known to us, and consists in the combination, with the pop-chamber $a$, of a constricted discharge-chamber, $d$, in which the steam is at a pressure approximating the boiler-pressure when the valve is blowing.

The pop-chamber $a$, as before explained, acts to lift the valve suddenly against the force of the spring for a certain distance; but our object is to lift the valve much higher, for to obtain the fullest possible relief from a given-sized valve it should be lifted high enough to leave the opening in the bushing practically uncovered, and to do this requires a lift equal to about one-quarter of the diameter of the opening—that is to say, about half an inch rise for a two-inch valve; and this rise we have obtained in the practical working of a valve embodying both features of our present invention, thereby giving a greater relief than has heretofore been given by valves of twice the diameter. The principle of this part of the invention consists in combining the pop-chamber $a$ with the constricted discharge-chamber $d$, constructed so that the steam must fill the chamber $d$ under a pressure sufficient to materially increase the pressure in pop-chamber $a$, and thereby lift the valve still farther from its seat. This is accomplished by causing the steam to pass from chamber $d$ through an outlet the area of which is about the same as the area through which the steam flows from the boiler into pop-chamber $a$ when the valve has risen, say, about one-third of the maximum rise desired, and so constructing the walls which bound this outlet that from that point the area of this outlet will increase as the valve rises.

In the drawings the outlet from the restricted discharge-chamber $d$ is the space between the inner surface of the bushing and the outer surface of the lip which forms the top and one side of the pop-chamber $a$, and the outlet from chamber $d$ remains substantially equal in area to the outlet from the boiler until the valve reaches the position shown in Fig. 5, and is at its maximum when the valve is lifted as far as it can be from its seat with a given spring and a given boiler-pressure—that is to say, until the lifting force and the load or force resisting the lift balance—and this will depend, as will now be clear, upon the construction of the chamber $d$ and its outlet. Were the steam to escape directly from the boiler into chamber $d$, (that is, were the lip dispensed with,) the valve would not pop until the pressure in the boiler rose considerably above the point at which the valve was set to open, because the area of outlet from the boiler into chamber $d$ would be small compared to the necessary area of the outlet from chamber $d$ until the pressure in the boiler had so risen. On the other hand, were the chamber $d$ omitted, the pressure in the pop-chamber $a$ would not rise high enough to give the extra lift to the valve until the pressure in the main discharge-chamber D approximated the boiler-pressure, because of the constriction at the outlet $d'$ from chamber D.

While it is practical in certain classes of valves to obtain this extra lift by properly adjusting the area of the outlet $d'$ from chamber D, yet the supplemental discharge-chamber $d$ is a far better way of accomplishing this.

What we claim as our invention is—

1. The combination of a safety-valve and a casing in which the valve fits and rises, having inlet and outlet openings for the waste steam, with a regulator, by the motion of which the pressure of the waste steam in the casing is controlled, substantially as and for the purpose described.

2. In a pop safety-valve, the combination, with the pop-chamber $a$, of the constricted discharge-chamber $d$, substantially as set forth.

HENRY G. ASHTON.
RANDALL GOULD.

Witnesses:
W. A. COPELAND,
JOHN R. SNOW.